United States Patent

Eikhoff

[11] Patent Number: 5,921,634
[45] Date of Patent: *Jul. 13, 1999

[54] WHEEL APPLIQUE AND LOCK

[75] Inventor: Ted E. Eikhoff, Grosse Pointe, Mich.

[73] Assignee: McKechnie Vehicle Components (USA), Inc., Troy, Mich.

[ * ] Notice: This patent is subject to a terminal disclaimer.

[21] Appl. No.: 09/070,413

[22] Filed: Apr. 30, 1998

Related U.S. Application Data

[62] Division of application No. 08/863,965, May 27, 1997., Pat. No. 5,829,843
[60] Provisional application No. 60/029,654, Oct. 28, 1996.

[51] Int. Cl.⁶ .................................................. B60B 7/06
[52] U.S. Cl. ................................. 301/37.43; 301/37.36
[58] Field of Search .................... 301/37.1, 37.42, 301/37.43

[56] References Cited

U.S. PATENT DOCUMENTS

| | | | |
|---|---|---|---|
| 1,858,228 | 5/1932 | Lyon | 301/37 |
| 1,985,378 | 12/1934 | Lyon | 301/37 |
| 3,517,968 | 6/1970 | Tulley et al. | 301/37 |
| 3,669,501 | 6/1972 | Derleth | 301/37 R |
| 3,918,762 | 11/1975 | Hampshire | 301/37 P |
| 4,251,476 | 2/1981 | Smith | 264/46.7 |
| 4,270,805 | 6/1981 | Spisak | 301/37 TP |
| 4,344,654 | 8/1982 | Apezynski | 301/37 R |
| 4,659,148 | 4/1987 | Grill | 301/37 P |
| 4,874,206 | 10/1989 | Sampson | 301/37 R |
| 4,976,497 | 12/1990 | Post et al. | 301/37 R |
| 5,031,966 | 7/1991 | Oakey | 301/37 P |
| 5,098,272 | 3/1992 | Joseph | 425/127 |
| 5,128,085 | 7/1992 | Post et al. | 264/254 |
| 5,131,727 | 7/1992 | Johnson | 301/37 P |
| 5,143,426 | 9/1992 | Todd | 301/37 P |
| 5,368,370 | 11/1994 | Beam | 301/37.36 |
| 5,435,631 | 7/1995 | Maloney et al. | 301/37.36 |
| 5,577,809 | 11/1996 | Chase | 301/37.43 |
| 5,595,423 | 1/1997 | Heck et al. | 301/37.43 |
| 5,597,213 | 1/1997 | Chase | 301/37.43 |
| 5,636,906 | 6/1997 | Chase | 301/37.43 |
| 5,664,845 | 9/1997 | Maloney et al. | 301/37.43 |

FOREIGN PATENT DOCUMENTS 2813412   10/1979   Germany .

*Primary Examiner*—Russell D. Stormer
*Attorney, Agent, or Firm*—Bliss McGlynn, P.C.

[57] ABSTRACT

A wheel assembly (10) includes a vehicle wheel (12) and an ornamental applique (14) which may be chrome plated, painted, etc. The applique (14) includes an extension flange (54) which extends over the peripheral rim edge (19) of the rim flange (18). Further, the applique (14) is locked to the rim flange (18) by a shoulder (64) coacting with the rim flange (18).

14 Claims, 3 Drawing Sheets

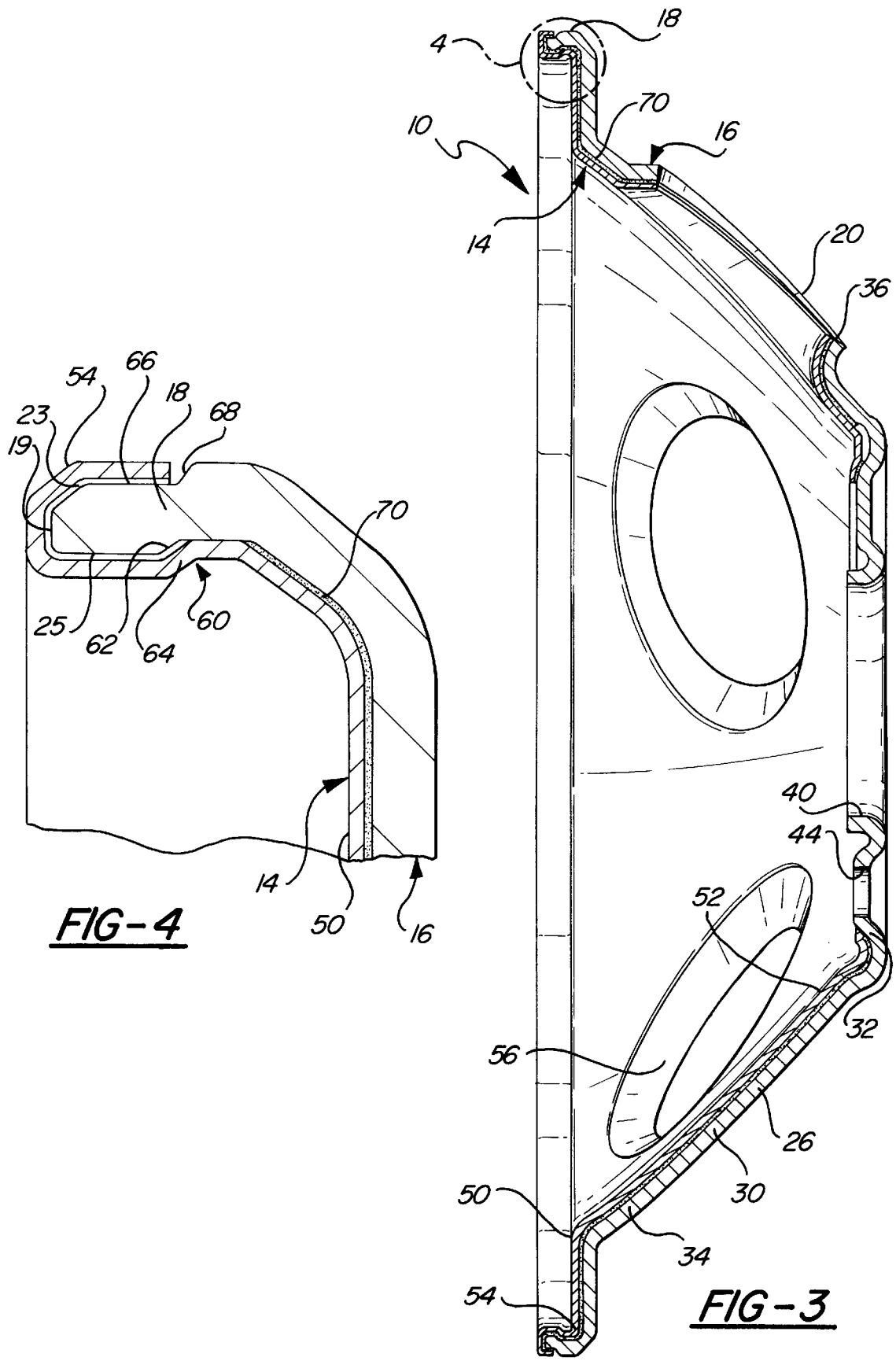

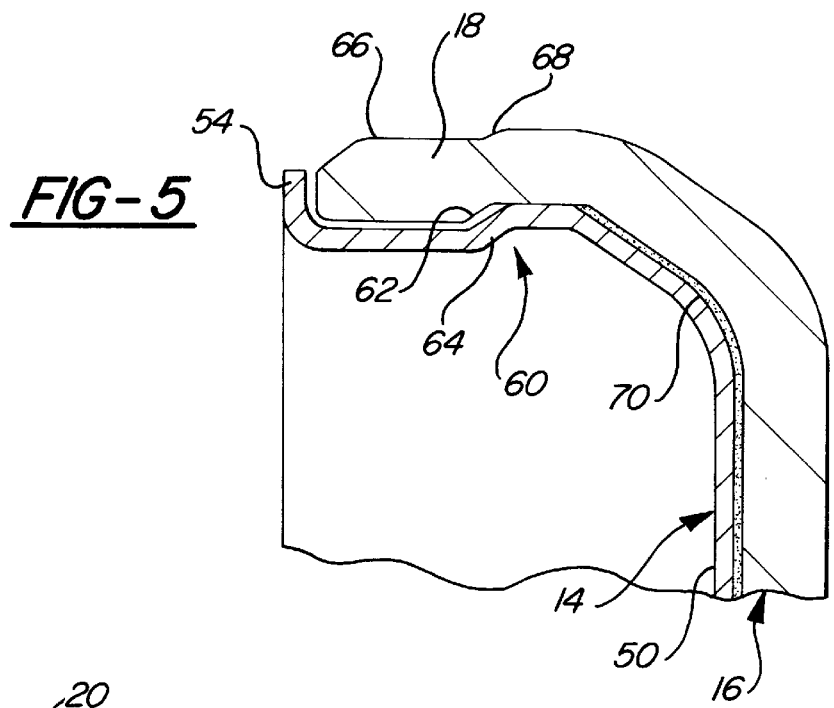
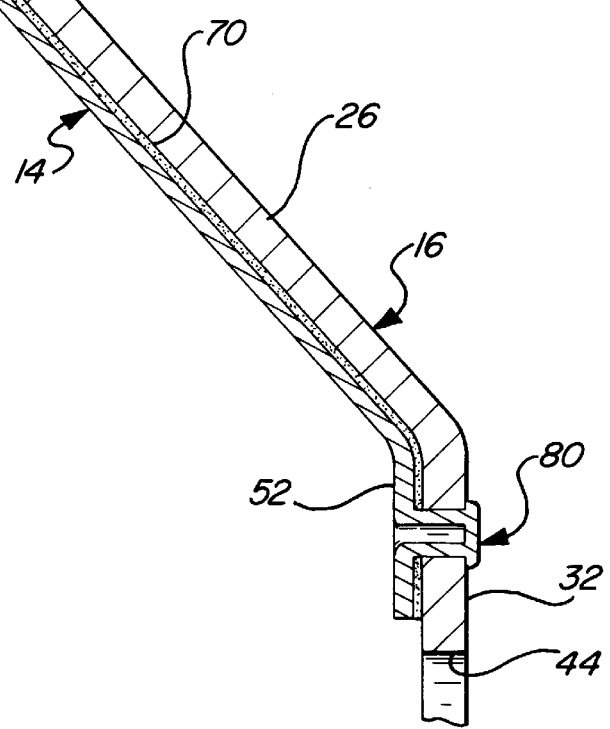

WHEEL APPLIQUE AND LOCK

RELATED APPLICATIONS

This application is a divisional of a U.S. patent application having Ser. No. 08/863,965, filed May 27, 1997, now U.S. Pat. No. 5,829,843, which is a continuation-in-part of U.S. provisional application having Ser. No. 60/029,654, filed Oct. 28, 1996.

BACKGROUND OF THE INVENTION

1. Technical Field

The invention relates to vehicle wheels of the type having an ornamental applique secured over the wheel for aesthetic purposes.

2. Related Art

It is becoming more popular to utilize ornamental wheel appliques on vehicle wheels to decorate the external surface thereof to improve the aesthetics of plain steel wheels or any other type of wheel. It is less expensive to place wheel appliques over steel wheels, as compared to the forming and finishing of aluminum alloy wheels.

One example of a wheel assembly with such an applique is illustrated in U.S. Pat. No. 5,368,370 issued Nov. 29, 1994 in the name of Beam, and assigned to the assignee of the subject invention. The applique follows the contour of the wheel and is adhered to the wheel face by an adhesive. The applique is locked under the rim flange of the wheel to further secure the applique to the wheel.

U.S. Pat. No. 3,726,566 issued Apr. 10, 1973 illustrates a wheel cover which includes lips which circumferentially extends about the entire periphery of the wheel cover end rim.

German Patent DE 28 13 412 discloses a wheel cover with the edges thereof profiled to grip into fitting grooves.

There are general requirements for any wheel assembly having a permanent ornamental surface treatment. There should be access to the lug nuts. Tire mounting/demounting machinery should be able to operate without damaging the ornamental surface treatment. The wheel assembly should be capable of receiving the standard clip-on balance weights at the rim flanges. There can be no loose components which would cause vibration and noise. The ornamental surface treatment should be secured so that it will not become accidentally disassembled or stolen. The wheel assembly should be durable so that it will not rust or corrode. And finally, the permanent ornamental surface treatment should be economical relative to other prior art surface treatments and ornamentation.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional view of the applique and wheel;

FIG. 4 is an enlarged view of the rim flange and extension member;

FIG. 5 is an enlarged view of an alternative embodiment of the rim flange and extension member; and FIG. 6 is a cross-sectional view of a second alternative of the wheel assembly.

DESCRIPTION OF THE PREFERRED EMBODIMENT(S)

Figure 1:
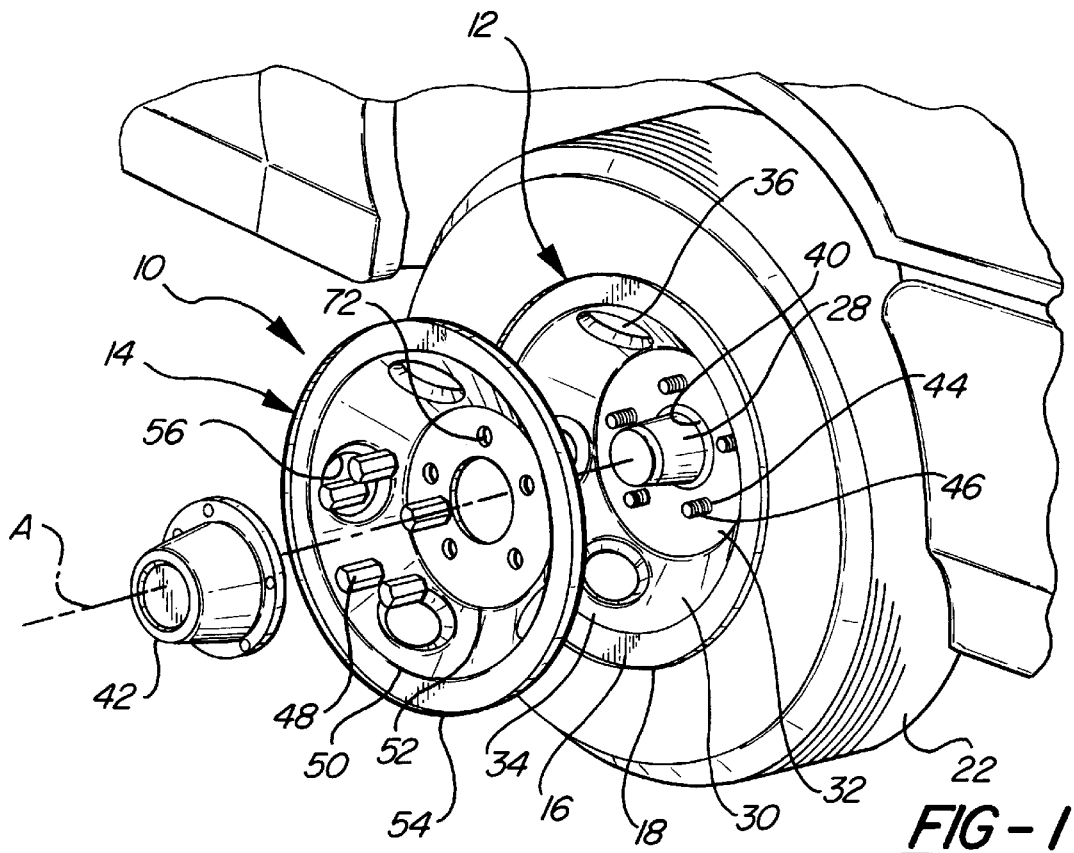
FIG. 1 is an exploded view of the preferred embodiment of the vehicle wheel assembly with a tire mounted to the rim.

A vehicular wheel assembly according to the subject invention is generally shown at 10 in the Figures. Throughout the different embodiments, like members are shown with like reference numerals, different embodiments being distinguished by the use of primed numerals. The wheel assembly 10 includes a wheel 12 and an applique 14 which provides a permanent ornamental surface treatment, such as chrome-plated stainless steel.

The wheel 12 includes an annular rim 16, defining a central axis A. The rim 16 includes a pair of rim flanges 18 (See FIG. 2) spaced on opposite sides of a well portion 20, over which a standard tube-type or tubeless tire 22 is mounted. Each of the rim flanges 18 extend out to a peripheral edge 19 (best seen in FIG. 4). A bead seat radius 24 is interposed between each of the rim flanges 18 and the well portion 20 for retaining the tire beads (not shown) of the tire 22. U.S. Pat. No. 5,368,370, assigned to the assignee hereof, is incorporated by reference to provide additional information of common wheel designs and basic teachings of the applique. The bead seat radius is on the outward radial side 23 of the rim flanges 18 with the inward radial side 25 provided on the wheel face.

A spider 26 is concentrically fixed within the rim 16 for connecting to a rotating hub 28. The spider 26 generally includes a plurality of spokes 30 which radiate from a center section 32 to a spoke flange 34. Venting spaces 36 are interposed between adjacent spokes 30. The spoke flange 34 interconnects with the rim 16. However, well-establish distinctions may become somewhat obscured in some type of wheels, such as the cast "full face" type, with the spider 26 extending integrally into the outer rim flange 18. However, any type of wheel face design can be used. In the illustrated embodiment of FIGS. 1 and 2, an aluminum wheel is shown, though any material wheel may be used with the subject invention.

With some wheel types, a weld line 38 may be present at the outer bead seat radius 24, such as in a steel wheel of the full face type, as illustrated in an alternative embodiment of FIG. 6. The effect of the weld line is that considerable surface disturbance is created on the visible side of the wheel assembly 10, in the area of the rim flange 18 and the spoke flange 34. In conventional prior art chrome plating situations, extensive surface preparation of this area of the wheel would be required due to the trauma induced by the weld line. Because chrome plating inherently amplifies all surface flaws, extra care would normally be required to prepare this area adjacent the weld line 38 prior to chrome plating the wheel.

Figure 2:
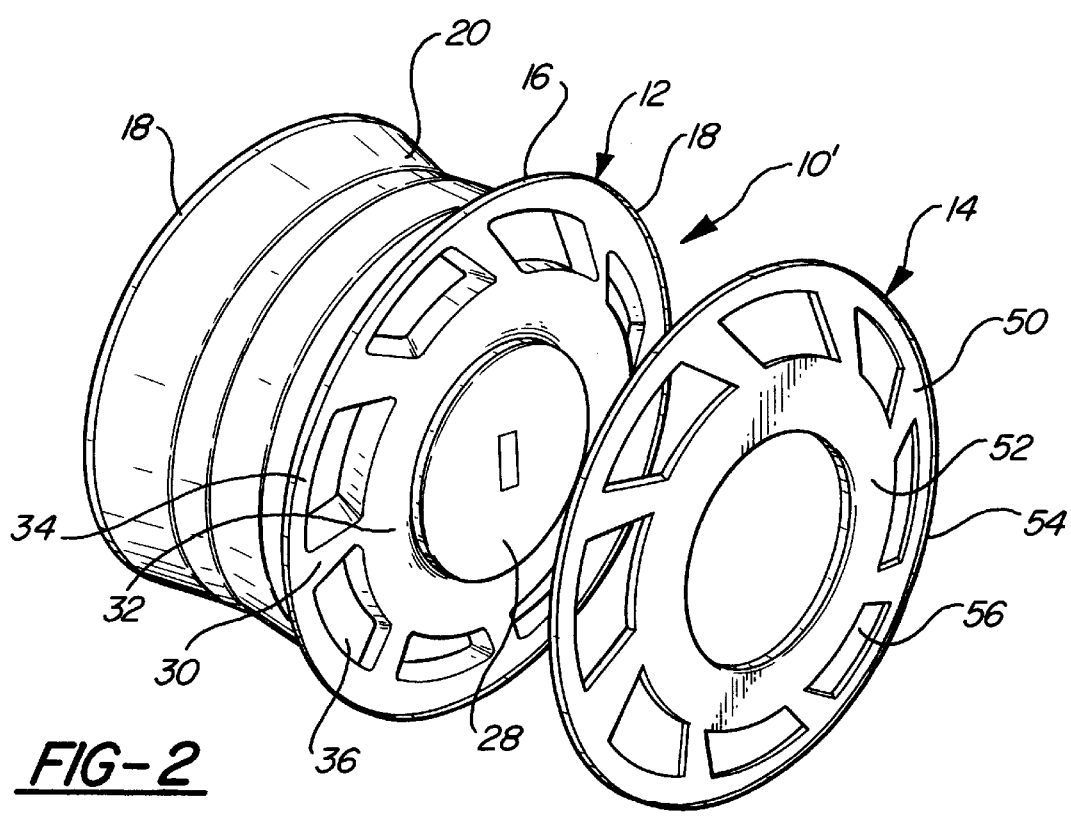
FIG. 2 is an exploded view of alternative embodiment.

The center section 32 of the spider 26 includes a center hole 40 for receiving the protruding portion of the hub 28 and its dust cap. As shown in FIGS. 1 and 2, various cap or cover 42 options are available for aesthetically trimming the center hole 40. In FIG. 1, the cover 42 for a steel wheel is generally frustoconical. In FIG. 2, the cover 42 for an aluminum wheel is a flat plate-like member. It should also be appreciated that different designs of wheel appliques 14 may not require or utilize a hub 28.

Disposed circumferentially about the center hole 40 are a plurality of lug stud holes 44. Standard threaded lug studs 46 extending from the hub 28 pass through the holes 44. As commonly known, lug nuts 48 are threaded onto the studs 46 to secure the wheel assembly 10 to the hub 28. Preferably, the rim 16 and the spider 26 sections of the assembly 10 are manufactured from fabricated or cast aluminum as illustrated in both FIGS. 1 and 2. Alternatively, as shown in FIG. 6, the rim 16 and spider 26 sections can be manufactured from fabricated steel or any other material commonly known in the art.

The wheel assembly 10 includes the ornamental applique 14 formed of a uniform thickness material, such as sheet steel or stainless steel. The applique 14 overlaps the rim 16, the spider 26 and rim flange 18 to present an ornamental surface treatment to the visible outer portions of the assembly 10. The applique 14 has an annular outer connecting portion 50 disposed adjacent the outer rim flange 18 and the spoke flange 34 of the spider 26. The applique 14 also includes an annular inner connecting portion 52 generally overlying at least a portion of the center section 32. The applique 14 also includes an extension flange portion 54 which wraps around the rim flange 18.

Further, the applique 14 includes a plurality of vent openings 56 aligned between the spokes 34 of the spider 26. The vent openings 56 are radially positioned between the inner 52 and the outer 58 connecting portions. Preferably, the vent openings 56 correspond with the vent spaces 36 of the wheel 12. The vent openings 56 may vary from the spoke 24 configuration so that different and unique ornamental designs can be achieved. In some cases, the number of vent openings 40 need not be equal to the number of vent spaces 36.

The applique 14 further includes a locking member 60 in the outer connecting portion 50 for mechanically locking the applique 14 to the rim flange 18. The locking member 60 maintains the applique 14 in pressing, compressive contact with adhesive 70 to ensure proper adhesion and thereby prevent the applique 14 from becoming disconnected from the rim 16 and spider 26 during operation. The locking members 60 also maintains the applique 14 to the wheel 12 when little or no adhesive 70 is utilized.

The locking member 60 includes an annular rim catch or shoulder 62 formed in the inward radial side 25 of the rim flange 18. An annular locking shoulder 64 of the outer connecting portion 50 of the applique 14 engages the annular rim catch 62 to hold the applique 14 in place while the adhesive 70, if any, cures, and thereafter. Preferably, the locking shoulder 64 is forced into engagement behind the catch 62 so that a spring-like pressure is exerted against the adhesive 70 by the applique 14.

Extending from the locking shoulder 64 is the extension flange portion 54 which extends along the rim 16, through a bend, and extends at least over the top or peripheral rim edge of the rim 16 to the outward side 23 (L-shaped) thereof as illustrated in FIG. 5, and alteratively, extends over the top of the rim flange 18 to encase the rim flange 14 (U-shaped) as illustrated in FIG. 4. In this latter embodiment, the edge of the extension flange portion 54 abuts or lies within a rim relief area 66 and adjacent a rim shoulder 68, provided in the outward side 23 to provide a flush or level surface between the extension flange 54 and inner rim 16. The extension flange 54 provides further decorative appearance of the spider and rim by disallowing the edge of the rim flange 18 to be visually exposed. This extension flange 54 is used for aesthetic purposes only and does not function as a locking device. In the prior art, the rim 16 in this portion may discolor or corrode (rust) distorting the decorative appearance of the wheel applique or applique 14. In this manner, the wheel applique 14 may be slid over the wheel and pressed to allow the locking shoulder 64 to snap against the catch 62 to retain the applique 14, with the extension flange portion 54 encasing the rim flange 18.

The applique 14 may also include a plastically deformed section 80 (See FIG. 6) in the inner connecting portion 52 as discussed in U.S. Pat. No. 5,368,370 issued Nov. 29, 1994, and incorporated by reference herein.

The inner connecting portion 52 of the applique 14 may or may not extend radially inwardly as far as the lug and stud holes 44. If the inner connecting portion 52 extends over the lug stud holes 44, corresponding apertures 72 are aligned over each of the lug stud holes 44 to permit passage of the studs 46. The specific configuration of the cap 42 determines the inward extent of the inner connecting portion 52. FIG. 2 shows an embodiment of the invention where the inner connecting portion 52 does not extend over the lug stud holes 44, because the cap 42 completely covers the lug nuts 48.

In FIG. 3, a cross section of one spoke 30 is shown with the overlying portion of the applique 14. The applique 14 extends into the vent opening 40, radially inwardly of the spokes 30. In other words, the entire outboard or visible surface of the wheel is covered by the applique 34 in the preferred embodiment. However, for aesthetic purposes, it may be desirable to cover only a portion of the wheel 12. This construction further rigidifies the applique 14, eliminates sharp edges to prevent cuts, and also helps seal or protect the adhesive 70 from direct contact with debris and the elements. This further helps prevent the applique 14 from rotating upon the spider 26 and assists in the alignment of the applique 14 over the spider 26 during assembly.

The adhesive 70 of substantially uniform thickness is provided for permanently bonding the applique 14 to the rim 16 and the spider 26 along overlapping surface areas. Preferably, the adhesive 70 is an epoxy material applied in a tacky, uncured condition between the wheel 12 and applique 14. When the adhesive 70 comprises an epoxy material, there is naturally a required drying or curing time. In practice, the adhesive 70 may be applied to the inner surface of the applique 14 or the outer surface of the wheel face, i.e. the rim 16 and spider 26. Favorable results have been achieved when the thickness of the adhesive 70 is less than twice the thickness of the applique 34. When the adhesive 70 is applied and the applique 14 assembled to the wheel 12, the locking member 60 compresses the adhesive between the applique 14 and wheel 12 to allow curing of the adhesive 70 and for further securement thereof. Alternatively, instead of using a glue type substance, the adhesive 70 may comprise double-sided tape or the like. Regardless of the specific adhesive 70 employed, it must be heat resistant so that its holding power is not compromised under high heat conditions.

The adhesive 70 is generally provided in the area of the inner and outer connecting portions 52, 50. However, the extension flange portion 54 may or may not utilize adhesive 70 which will not effect the securement of the applique 14 to the wheel. Alternatively, a bead of adhesive 70 may be placed at the tip of the rim flange 18 near the inside and/or outside corners thereof (see FIG. 4) which is compressed upon assembly.

The subject wheel assembly 10 is formed by the steps of forming the annular rim 16 with a pair of rim flanges 18, forming the spider 26 with a plurality of spokes 30 and interposed venting spaces 36, supporting the spider 26 concentrically within the rim 16, preforming an ornamental applique 14 with annular outer and inner connecting portions 50, 52 and the extension flange portion 54, applying an adhesive 70 between the applique 14 and rim 16, positioning the applique 14 centrally over the spider 26 and the rim 16 and around the rim flanges 18 while aligning the applique vent openings 56 in the spaces between the spokes 30, compressing the adhesive 70 into a substantially uniformly thick space between the applique 14 and the spider 26, and mechanically maintaining the compressing step until the adhesive 70 is set.

The steps of forming the applique 14 includes forming the inner and outer connecting portions 52, 50 with the vent openings 56 and forming the extension flange 54 as a generally L or U-shape to slide over the rim flange 18. Thereafter, the applique 14 is snapped onto the wheel 12.

The step of mechanically maintaining the adhesive 70 in compression between the applique 14 and the spider 26 and the rim 16 includes forming an annular catch 62 in the outer rim flange 18, and force fitting the locking shoulder 64 of the applique 14 into the catch 62.

The method further includes plating the applique 14 with a metallic composition containing a percentage of chromium prior to positioning the applique over the spider 26 and rim 16. This plating step is accomplished using well-known electro-plating technology.

The subject wheel assembly 10 as constructed in accordance with the preferred embodiment described above creates a functional and durable composite wheel assembly 10 having a permanent ornamental chromium surface treatment at a relatively low cost. The wheel assembly 10 is constructed to permit access of tire mounting equipment and the normal inclusion of balance weights about the rim flanges 18. Further, the assembly 10 is permanently fixed so as to preclude theft of components or accidental loss of the applique 14. Further, the full surface adhesive 70 fixation technique creates an assembly 10 which will not vibrate between the applique 14 and the remainder of the assembly 10.

In the subject design, the ornamental applique 34 may be of steel or other metal material, but may also be of plastic with a finished decorative outer surface. Such plastic surfaces have been either chrome plated, painted, etc.

In the preferred embodiment, the applique 14 is fabricated from a uniform thickness material in a stamping or die forming operation. It will be readily appreciated that such a forming technique is quick, easy and relatively inexpensive. The extension flange portion 54 and locking shoulder 64 may be formed in the same die forming operation with tools and dies. Alternatively, the outer and inner connecting portions 50, 52 may be die formed and the locking shoulder 64 and bent extension flange being contoured by a spun forming process. Various types of surface finishing may be utilized, such as chrome plating, painting, metal brushing, etc. Furthermore, the adhesive 70 may be used, but it is also possible to omit the adhesive 70 due to the locking shoulder 64. The adhesive 70 is useful also in sealing the area behind the wheel applique 14 and to the spider 20. The shape and decorative design of the wheel applique or skin 14 may vary and may either cover some of the wheel apertures or vents, as desired. Furthermore, additional fasteners may be utilized to fasten the wheel applique to the wheel directly at the center. In this case, the inner connecting portion 52 extends inwardly as far as the lug stud holes, and provides clearance for the lug stud fasteners 48. Also, separate fasteners may be placed through apertures between the lug stud holes from the backside into apertures in the wheel applique to secure the wheel applique to the wheel directly. It is to be appreciated that other designs of wheel appliques would be encompassed within the teachings herein.

Though the invention has been described with an applique 14 which follows the contour of the wheel 12, the subject invention may also be used with an applique which has a different contour than the wheel, as disclosed in U.S. Ser. No. 08/739,035 filed Oct. 28, 1996. A structural insert between the applique and wheel may be used to modify the contour of the final wheel from the wheel contour, while still using the extension flange and locking member.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the present invention may be practiced other than as specifically described.

I claim:

1. A vehicle wheel assembly having an ornamental surface treatment, said assembly comprising:

an annular rim defining a central axis and having a rim flange extending to a peripheral rim edge separating an inward radial side of said annular rim and an outward radial side of said annular rim, said inward radial side opposing said outward radial side and connected therebetween by the peripheral rim edge;

a spider concentrically fixed within said rim for connecting to a rotating hub;

an ornamental applique overlapping said inward radial side of said rim and said spider and said rim flange;

said ornamental applique having an annular outer connecting portion disposed adjacent said inward radial side of said rim flange, an annular inner connecting portion disposed adjacent said spider, and an extension flange extending radially out past said annular outer connecting portion and over the rim flange to cover said peripheral rim edge and extending to said outward radial side of said rim flange; and said annular outer connecting portion including a locking member therein for locking said ornamental applique to said annular rim at said inward radial side of said rim flange.

2. An assembly as set forth in claim 1 wherein said extension flange extends over said peripheral rim edge of said rim flange and adjacent said outward radial side.

3. An assembly according to claim 2 wherein said extension flange extends along said outward radial side along said rim flange.

4. An assembly as set forth in claim 3 wherein said locking member includes an annular catch formed in said inward radial side of said rim flange.

5. An assembly as set forth in claim 4 wherein said locking member includes a locking shoulder formed in said outer connecting portion coacting with said annular catch.

6. An assembly as set forth in claim 3 wherein said outward radial side of said rim flange includes a relief therein, said extension flange of said applique extending within said relief.

7. An assembly as set forth in claim 6 wherein said extension flange is flush with said rim flange when said extension flange extends within said relief.

8. An assembly as set forth in claim 7 wherein said outward radial side of said rim flange adjacent said relief includes a rim shoulder adjacent the end of said extension flange.

9. An assembly set forth in claim 1 further including an adhesive between said ornamental applique and at least one of said rim or spider.

10. An assembly set forth in claim 1 wherein said ornamental applique comprises a sheet metal stamping.

11. An assembly as set forth in claim 3 wherein said locking shoulder is formed by a die forming process with said inner and outer connecting portions and said extension flange.

12. An assembly as set forth in claim 11 wherein said inner and outer connecting portions are die formed, and said locking shoulder and said extension flange are formed by a spin forming process.

13. An assembly as set forth in claim 3 wherein said ornamental applique has a substantially uniform thickness and said adhesive has a substantially uniform thickness.

14. A method of making a vehicle wheel assembly having an ornamental surface treatment, the method including the steps of:

providing a vehicle wheel having an annular rim and a rim flange with a spider concentrically fixed between the rim for connecting to a rotating hub;

forming an applique having an annular outer connecting portion to be disposed adjacent the rim flange and an inner connecting portion;

forming an extension flange from the outer annular connecting portion having a bend to extend over a peripheral edge of the rim flange; and placing the formed applique over the vehicle wheel with the extension flange overlapping the peripheral edge of the rim flange.

* * * * *

UNITED STATES PATENT AND TRADEMARK OFFICE
CERTIFICATE OF CORRECTION

PATENT NO.    : 5,921,634                                                  Page 1 of 1
DATED         : July 13, 1999
INVENTOR(S)   : Ted E. Eikhoff It is certified that error appears in the above-identified patent and that said Letters Patent is hereby corrected as shown below:

<u>Column 2,</u>
Line 26, after "radius" insert -- 24 --.

<u>Column 3,</u>
Line 21, delete "34" and insert -- 30 --.
Line 23, delete "58" and insert -- 50 --.
Line 26, delete "24" and insert -- 30 --.
Line 28, delete "40" and insert -- 56 --.

<u>Column 4,</u>
Line 22, delete "40" and insert -- 56 --.
Line 24, delete "34" and insert -- 14 --.
Line 44, delete "34" and insert -- 14 --.

<u>Column 5,</u>
Line 51, delete "bent extension flange" and insert -- extension flange 54 --.
Line 57, delete "20" and insert -- 26 --.
Line 63, after "holes" insert -- 44 --.

Signed and Sealed this

Fifteenth Day of October, 2002

Attest:

JAMES E. ROGAN
Attesting Officer              Director of the United States Patent and Trademark Office